March 18, 1958   E. K. BUYZE   2,827,132
DISK BRAKES
Filed Oct. 4, 1956   3 Sheets-Sheet 1
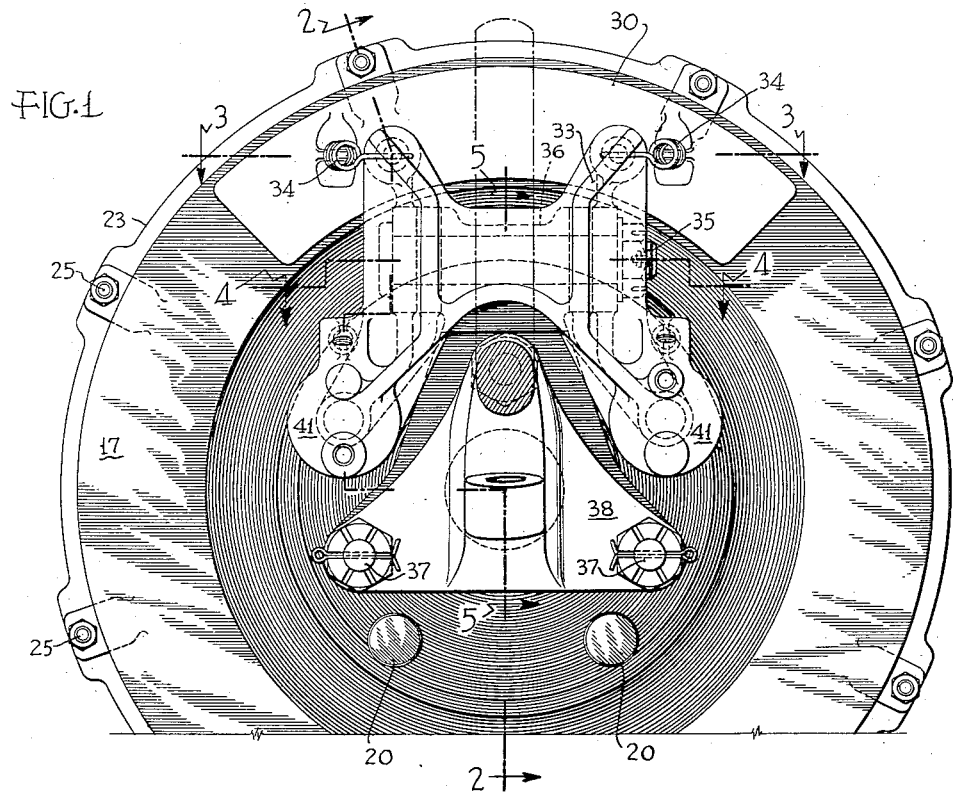
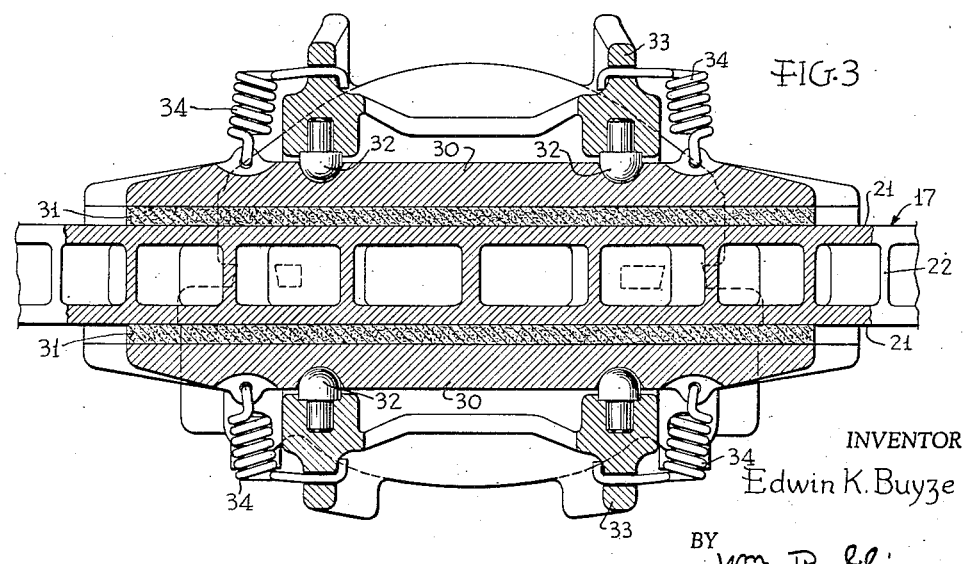
INVENTOR
Edwin K. Buyze
BY Wm. R. Glisson
ATTORNEY March 18, 1958  E. K. BUYZE  2,827,132
DISK BRAKES Filed Oct. 4, 1956  3 Sheets-Sheet 2

INVENTOR
Edwin K. Buyze
BY
Wm. R. Glisson
ATTORNEY

March 18, 1958 E. K. BUYZE 2,827,132
DISK BRAKES
Filed Oct. 4, 1956 3 Sheets-Sheet 3
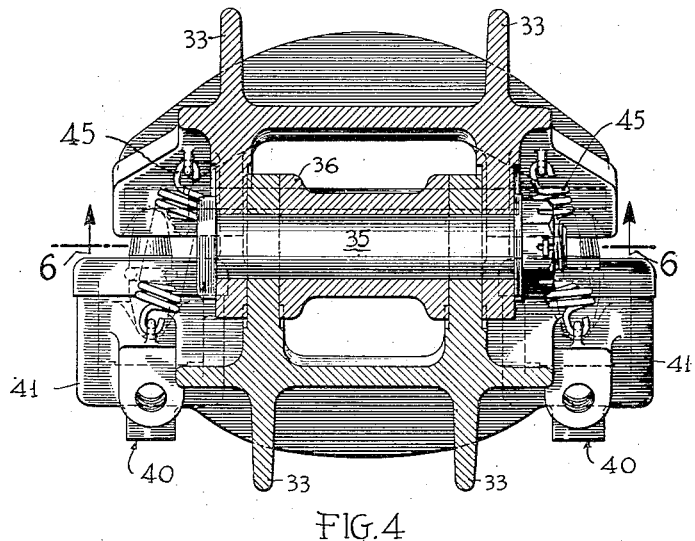
FIG. 4
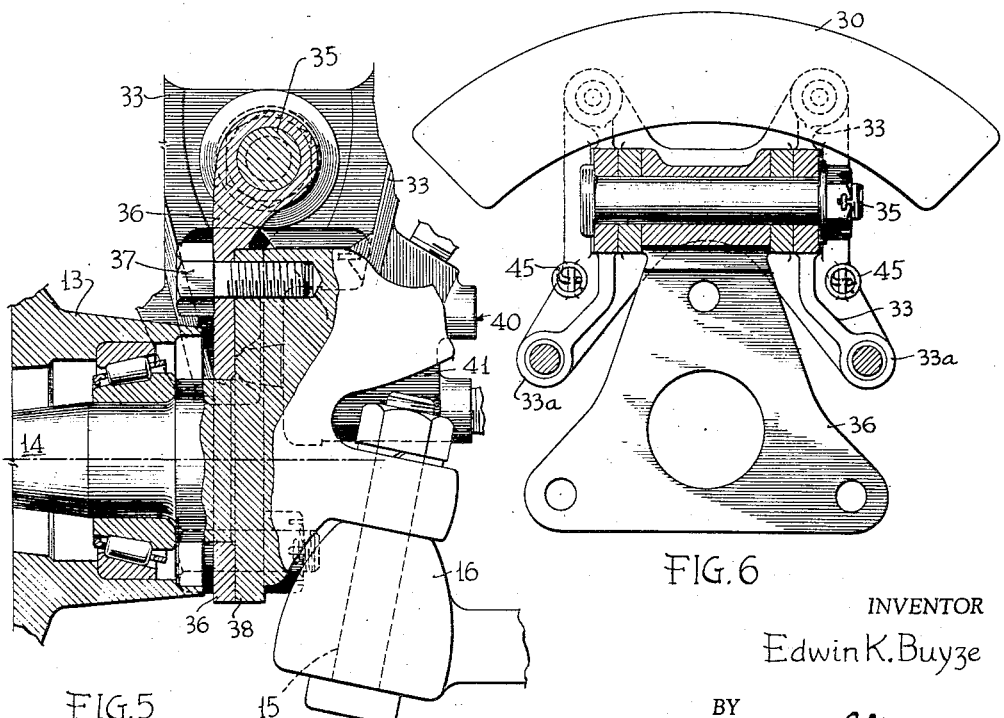
FIG. 5
FIG. 6
INVENTOR
Edwin K. Buyze
BY
Wm. R. Glisson
ATTORNEY

United States Patent Office 2,827,132
Patented Mar. 18, 1958

2,827,132
DISK BRAKES

Edwin K. Buyze, St. Clair Shores, Mich., assignor to The Budd Company, Philadelphia, Pa., a corporation of Pennsylvania Application October 4, 1956, Serial No. 613,863

4 Claims. (Cl. 188—73)

This invention relates to disk brakes, especially for automobiles, and has for an object the provision of improvements in this art.

One of the particular objects of the invention is to provide a brake of great power but which takes only a small amount of space.

Another object is to provide a non-self-energizing brake which provides stopping power approaching that of a self-energizing brake.

Another object is to provide a brake which does not materially hinder access to usual operating parts at the wheel location, even for steered wheels.

Another object is to provide a brake which has a smooth braking action and which under no conditions will lock against release.

The above and other objects and advantages of the invention will be apparent from the following description of an exemplary embodiment, reference being made to the accompanying drawings thereof, wherein:

Fig. 1 is an inside face elevational view of a steered wheel assembly embodying the present invention;

Fig. 3 is a section parallel to the wheel axis through the brake shoes, the section being taken on the line 3—3 of Figs. 1 and 2;

Fig. 4 is a section parallel to the wheel axis through the fulcrum pivot or trunnion, the section being taken on the line 4—4 of Figs. 1 and 2;

Fig. 5 is a broken section generally parallel to the wheel axis taken on the line 5—5 of Fig. 2; and Fig. 6 is a section and elevation taken on the line 6—6 of Fig. 4.

Figure 2:
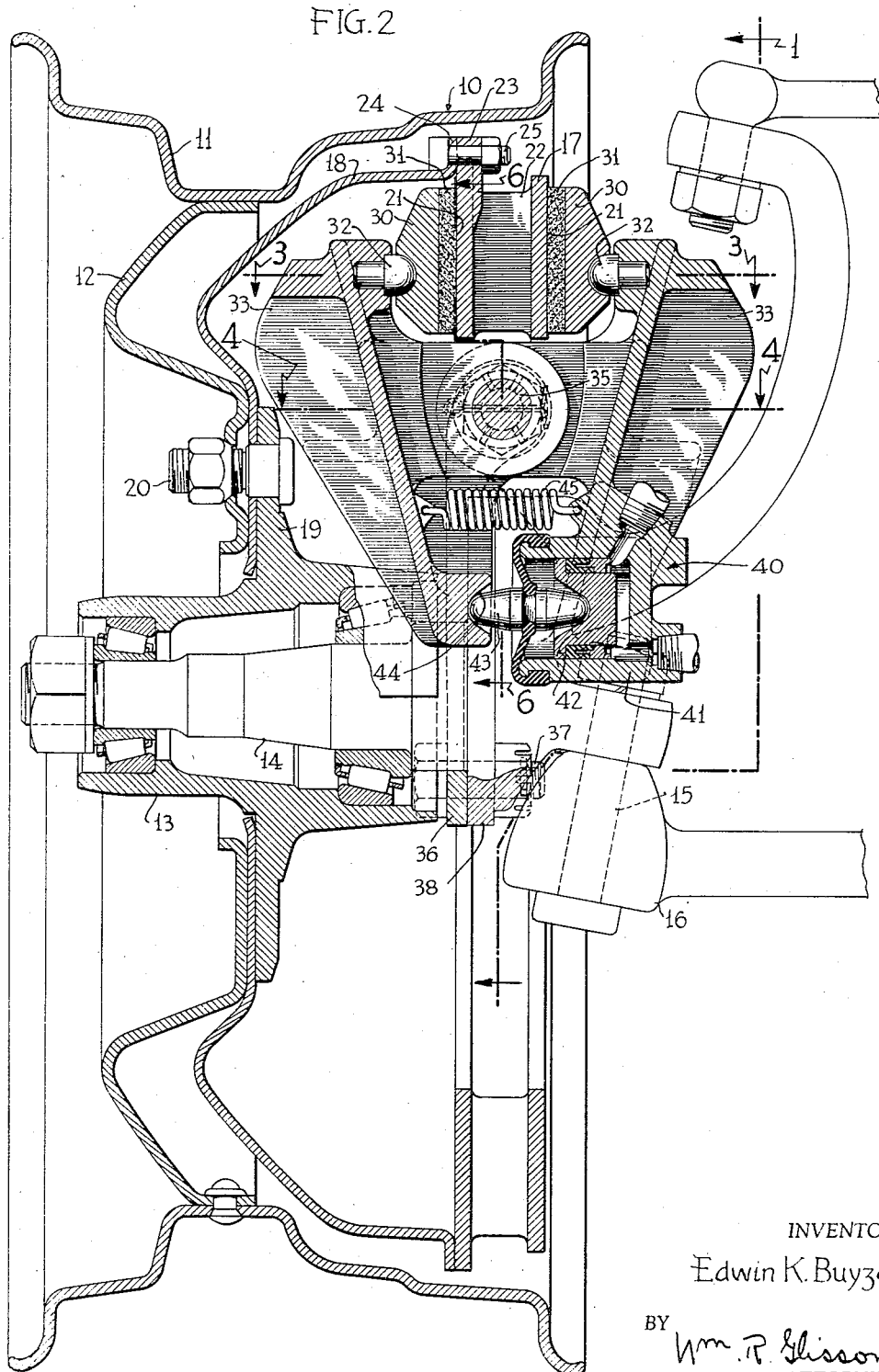
Fig. 2 is a vertical axial section taken on the line 2—2 of Fig. 1.

The brake is illustrated in connection with the steered wheel 10 of an automobile, the wheel comprising a rim 11, a disk 12, and a hub 13 mounted on bearings on a steered spindle 14 mounted to turn about an axis 15 on a support 16.

A brake disk 17 is carried on a supporting disk 18 which is secured to the hub flange 19 by the same bolts 20 which secure the wheel disk 12 to the flange. The brake disk has dual outer braking surfaces 21 and is open at the center, the sides being connected by air circulating webs 22. The brake disk 17 has a flange 23 which mates with a flange 24 of the supporting disk 18 and the flanges are secured together by bolts 25.

Opposed brake shoes 30 faced with non-metallic composition lining 31 act on the braking surfaces of the brake disk 17, the shoes being mounted on ball pivots 32 carried by brake levers 33 and retained thereon by springs 34.

The brake levers 33 are mounted on a shaft or trunnion pin 35 carried by a support 36 anchored, as by cap screws 37, to the base 38 of the spindle support.

The inner ends of the brake levers 33 are bifurcated, as at 33a, to straddle the spindle and the opposed furcations have disposed between their ends power operators 40 comprising a fluid cylinder 41 carried by the outer arm, a piston 42 operating in the cylinder, and a round-ended piston rod 43 disposed between the piston and a concave seat 44 on the inner brake lever. Springs 45 urge the levers in a direction to oppose the power devices and move the brake shoes away from the brake disk.

The brake levers are ribbed, both inside and out, to give them great rigidity and strength.

It is thus seen that the invention provides a simple, compact and effective brake assembly of great power for its size and of minimum obstruction to normal parts.

While one embodiment of the invention has been described for purposes of illustration, it is to be understood that there may be various embodiments and modifications within the general scope of the invention.

What is claimed is:

1. A disk brake assembly for spindle-mounted wheels having a rim and disk connected to a spindle-mounted hub, comprising in combination with the spindle, its support, and the spindle-mounted wheel, a radial brake disk carried by the wheel surrounding said spindle, lined brake shoes operating on said disk, a transverse trunnion shaft located between the brake shoes and said spindle, a bracket mounted on the spindle support carrying said trunnion shaft, a pair of brake levers mounted on said trunnion shaft and carrying said brake shoes at their outer ends, the inner ends of said brake levers being bifurcated to stand at opposite sides of the spindle, and power devices for operating said brake levers mounted between paired furcations of the inner ends of the brake levers at opposite sides of the spindle.

2. A disk brake assembly as set forth in claim 1, further characterized by the fact that the outer ends of said brake levers are also bifurcated to act on said brake shoes at circumferentially spaced points.

3. A disk brake assembly as set forth in claim 1, further characterized by the fact that each of said power devices comprises a cylinder and piston device arranged parallel to the spindle axis, the cylinder being carried by one lever and the piston mounted to act on the other lever.

4. A disk brake assembly as set forth in claim 1, further characterized by the fact that the brake lever bifurcations are connected by a transverse portion at the trunnion shaft.

References Cited in the file of this patent

UNITED STATES PATENTS

| | | |
|---|---|---|
| 1,928,743 | Sneed | Oct. 3, 1933 |
| 2,115,083 | Pierce | Apr. 26, 1938 |
| 2,655,227 | Eksergian | Oct. 13, 1953 |
| 2,672,956 | Webb et al. | Mar. 23, 1954 |